(No Model.)
W. F. SMITH.
FRAME FOR SECONDARY BATTERY PLATES.
No. 412,345. Patented Oct. 8, 1889.
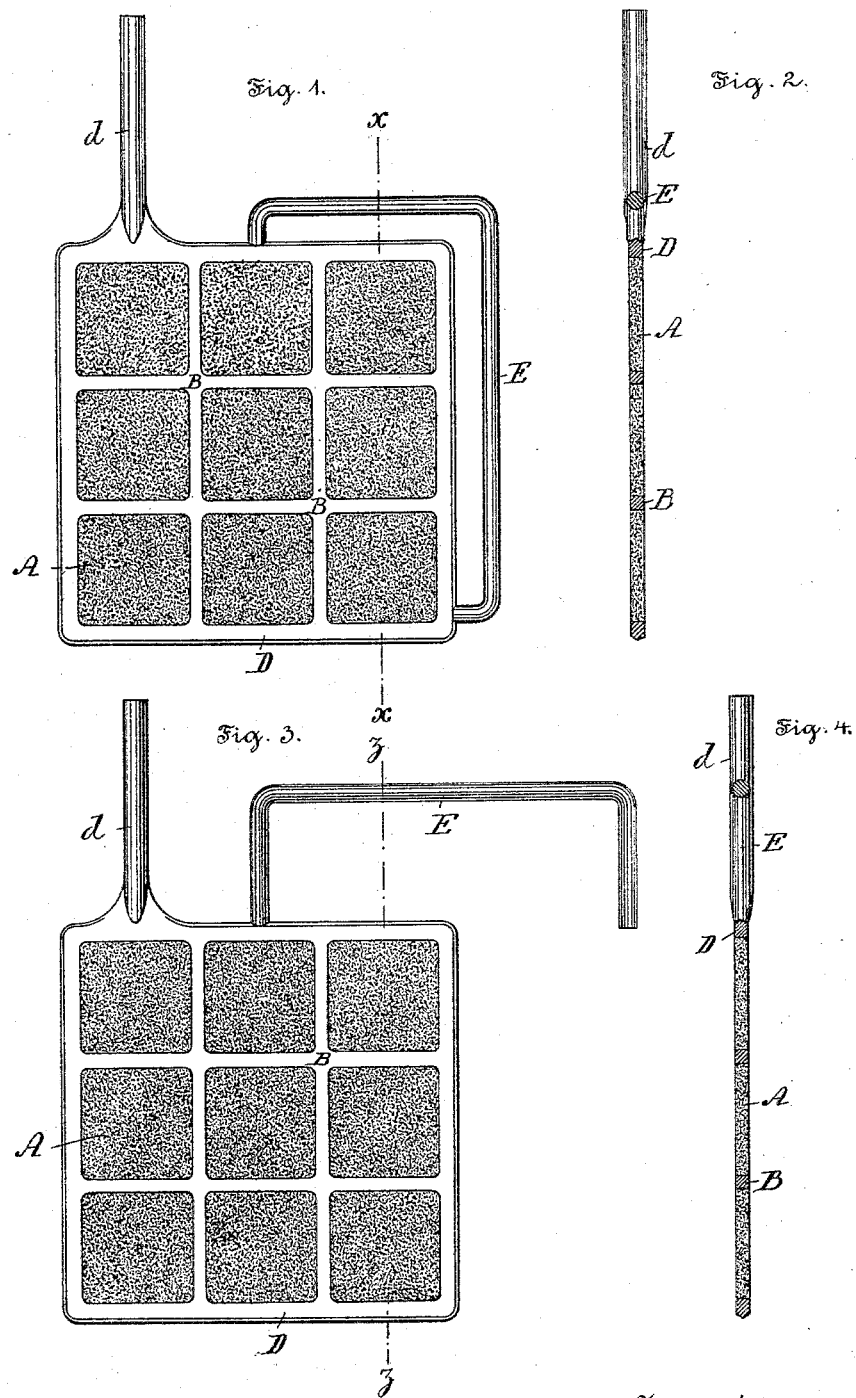
Witnesses:
Hermann Bormann
Thomas M. Smith
Inventor:
Walter F. Smith
by J. Walter Douglass
Att'y

UNITED STATES PATENT OFFICE.

WALTER F. SMITH, OF PHILADELPHIA, PENNSYLVANIA, ASSIGNOR TO THE UNITED ELECTRIC IMPROVEMENT COMPANY, OF GLOUCESTER CITY, NEW JERSEY.

FRAME FOR SECONDARY-BATTERY PLATES.

SPECIFICATION forming part of Letters Patent No. 412,345, dated October 8, 1889.

Application filed April 2, 1889. Serial No. 305,757. (No model.)

*To all whom it may concern:*

Be it known that I, WALTER F. SMITH, a citizen of the United States, residing at Philadelphia, in the county of Philadelphia and State of Pennsylvania, have invented certain new and useful Improvements in Frames for Supporting Crystallized Plates to Form the Electrodes of Secondary or Storage Batteries, of which the following is a specification.

My invention relates to certain new and novel features of improvement in the construction of supporting-frames around crystallized plates composed of a salt or salts of a metal or metals to "form" the electrodes of a secondary or storage battery after reduction from a salt or chloride to a metallic state, and each of said supporting-frames being provided with a lug and auxiliary loop or extensions for insuring the necessary connections being made during reduction of the plate or plates to a metallic state for redevelopment and use as the electrodes of a secondary or storage battery.

Heretofore it has been customary to cast a lug to one of the edges of each of the crystallized plates and the plates were then reduced to a metallic state by electrolysis or chemical action, and when the former method was resorted to for the reduction of the plates to a metallic state the wires used to connect the plates with each other and with the poles of a dynamo were attached to the lugs forming part of the aforesaid frames thereof.

The chlorides of many of the metals which when reduced to the metallic state are highly desirable for use as the electrodes of a secondary or storage battery are poor conductors of electricity, as well as more or less fragile when cast into structures; hence it has been found not only extremely difficult but almost impossible to obtain a good electrical contact through the wires and lugs with the active material or such as was to become active to constitute the electrodes. In the reduction of such type of plates to a metallic state by either of the aforesaid methods the plates are usually lifted by means of the lugs into and out of the electrolyte of the cell; but the constant tendency has been in so doing for the plates to crack or break, as well as the surrounding frames thereof, due to transverse or torsional strain brought to bear upon them. Moreover, the binding-screws and other devices used in practice to connect the wires with the lugs during the electrolytic reduction of the plates wear away or destroy more or less the lugs, so that it often becomes extremely difficult to connect the finished plates together to form the cell or cells of a battery or batteries.

It may be remarked that owing to the size and shape of the plates and of the lugs which project from the frames of the plates, and in order to have the lugs project above the fluid the plates are immersed in, it is necessary to place them in a vertical position, properly insulated, of course, from each other and the cell or vases. Therefore the superficial area of said cell or vases must be unduly large.

The principal objects of my invention are to overcome the above-mentioned defects and to provide the plates to form the electrode or electrodes of a secondary or storage battery with supporting-frames and an auxiliary loop or extensions to furnish the necessary connections during the formation of the plate or plates to become the electrode or electrodes, so that the plate or plates may be easily connected or coupled together and with a dynamo, and lifted into or out of the electrolyte of the cell or vases without danger of breaking or injury to the plate or plates.

My invention consists in providing the plate composed of a series of small plates with a frame having a vertical lug and with an extension or auxiliary loops cast with or secured to the main portion of the surrounding frame of the series of plates for connecting a wire or wires from the poles of a dynamo therewith, as well as with the lugs, if desired, and thereby enabling the requisite number of plates to be readily connected or coupled together, and with the poles of a dynamo for obtaining a good contact for the passage of the current of electricity from the dynamo for the reduction of said plates to a metallic state to form the electrodes of a secondary or storage battery. The projections or auxiliary loops cast with or secured to the main portion of the surrounding frame of the series of plates, composed of active matter or that to become active and to form the electrode in its subsequent use as a secondary or storage battery, may, if desired, be permitted to remain as a part of the frame surrounding the finished metallic plate; but I prefer, however, to remove these auxiliary loops or extensions after the reduction of the plate or plates is completed.

The nature and characteristic features of my invention will be more fully understood taken in connection with the accompanying drawings, forming part hereof, and in which—

Figure 1 is a vertical side elevation of several plates held in a supporting-frame provided with one form of my improved extension or auxiliary loop. Fig. 2 is a transverse sectional view on the line $x\ x$ of Fig. 1. Fig. 3 is a vertical side elevation of several plates held or supported in a frame provided with another form of extension or auxiliary loop, and Fig. 4 is a cross-sectional view on the line $z\ z$ of Fig. 3.

Referring to the drawings for a further description of the invention, A represents a series of square or other suitable form of plates composed of active matter or matter to become active, and between each of which plates is formed a partition-wall B, as shown in Figs. 1 and 3, which walls preferably form part of the supporting-frame D, composed of lead or other suitable material or materials. This frame supporting the several small plates A has cast therewith or secured into one of the corners thereof a lug $d$. There is also cast with or secured into the supporting-frame D an auxiliary loop or other form of extension E, made of lead or other material or materials. This auxiliary loop or extension E may be connected at both of its ends with the supporting-frame D, as shown in Fig. 1, or may be connected only at one of its ends to said frame, as shown in Fig. 3. This auxiliary loop or extension, which, if desired, may be made a permanent part of the frame D, serves as a handy means for enabling the necessary connections being made with a dynamo for the "formation" of the electrode or electrodes for use as a secondary or storage battery. After formation, however, of the electrode or electrodes, if desired the loop may be cut off or withdrawn from the frame D.

By arranging, in connection with the supporting-frame D, an auxiliary loop E, substantially in the manner illustrated in either Figs. 1 or 3, the connection of a dynamo with the plates to be reduced to a metallic state is not only greatly simplified and the labor incident thereto materially reduced, but the reduction is much more thoroughly and satisfactorily accomplished and without fear of the plates to form electrodes becoming cracked or warped or the shape of the frame around them distorted or interfered with in any manner, all of which conduce to the perfection of metallic plates for use as the electrodes of a secondary or storage battery.

Having thus described the nature and objects of my invention, what I claim as new, and desire to secure by Letters Patent, is—

1. The herein-described supporting-frame for a battery plate or element, provided with an auxiliary loop, substantially as and for the purposes set forth.

2. The herein-described supporting-frame, provided with a lug and partition-walls between and around plates composed of the salts or chlorides of a metal or metals to form an electrode, and said frame having a loop secured thereto, substantially as and for the purposes set forth.

3. The herein-described frame, supporting in position a series of plates to form an electrode, and provided with a permanent lug and an auxiliary loop or extension, substantially as and for the purposes set forth.

In witness whereof I have hereunto set my signature, in the presence of two subscribing witnesses, this 1st day of April, A. D. 1889.

WALTER F. SMITH.

Witnesses:
GEO. W. REED,
THOMAS M. SMITH.